United States Patent
Kallenbach (12)

(10) Patent No.: US 6,455,461 B1
(45) Date of Patent: Sep. 24, 2002

(54) HYDROTREATING CATALYST COMPOSITION AND PROCESSES THEREFOR AND THEREWITH

(75) Inventor: Lyle R. Kallenbach, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/404,064

(22) Filed: Sep. 23, 1999

Related U.S. Application Data

(62) Division of application No. 08/909,591, filed on Aug. 12, 1997, now Pat. No. 5,994,257.

(51) Int. Cl.$^7$ .............................. B01J 21/02; B01J 23/42

(52) U.S. Cl. ...................... 502/207; 502/202; 502/334; 502/349; 423/279

(58) Field of Search ............................... 502/207, 202, 502/349, 334, 355; 423/278, 279

(56) References Cited

U.S. PATENT DOCUMENTS 5,705,723 A * 1/1998 Kallenbach et al. ........ 585/270
5,948,243 A * 9/1999 Kallenbach ............. 208/216 R

* cited by examiner

*Primary Examiner*—Bekir L. Yildirim
(74) *Attorney, Agent, or Firm*—Jeffrey R. Anderson

(57) ABSTRACT

A composition comprises a hydrogenation catalyst supported on an inorganic support which comprises aluminum, zirconium, and a borate. A process for producing the composition comprises the steps of (1) contacting an aluminum salt, a zirconium salt, and an acidic boron compound under a condition sufficient to effect the production of a solid material comprising aluminum, zirconium, and borate; and (2) combining a hydrogenation catalyst with the inorganic support. Also disclosed is a process for reducing aromatic compounds content in a hydrocarbon-containing fluid which comprises contacting a hydrocarbon-containing fluid, in the presence of a catalyst composition, with hydrogen wherein said catalyst composition comprises a hydrogenation catalyst and an inorganic support wherein said support comprises aluminum, zirconium and a borate.

20 Claims, No Drawings

HYDROTREATING CATALYST COMPOSITION AND PROCESSES THEREFOR AND THEREWITH

This application is a divisional of application Ser. No. 08/909,591, filed on Aug. 12, 1997 now U.S. Pat. No. 5,994,257.

FIELD OF THE INVENTION

This invention relates to a borate-containing composition which can be effective as a catalyst for hydrogenating aromatic hydrocarbons, to a process for producing the composition, and to a process for using the composition.

BACKGROUND OF THE INVENTION

In an alkylation process, complex saturated hydrocarbon molecules are formed by direct union of a saturated hydrocarbon molecule and an unsaturated hydrocarbon molecule. For example, light compounds such as isobutane and butylene are converted into heavier compounds through the control of temperature and pressure in the presence of an acid catalyst. Hydrofluoric acid is presently widely used as an alkylation catalyst.

Some undesirable aromatic compounds such as, for example, heavily substituted aromatic compounds, wherein each of the alkyl groups has about 3 to about 9 carbon atoms per alkyl group, are also produced in an alkylation process. When the alkylation products are used in household products, food-related applications, cosmetics, and lantern fuel, it is generally required that they be substantially free of any aromatic compounds. The concentration of aromatic compounds can generally be reduced to 0.03 weight % or higher by a hydrotreatment process using commercially available nickel catalysts. However, reduction of aromatic compounds to less than 0.03 weight % by such hydrotreatment has never been achieved with commercially available catalysts. Therefore, a more active catalyst is required to substantially reduce the content of aromatic compounds, especially from the heavy end of the alkylate fraction. It is also highly desirable to develop a new catalyst that can substantially reduce the concentration of the undesirable aromatic compounds.

Furthermore, sulfur or sulfur-containing compounds may be present in refining processes and potentially could be present in an alkylation process. Commercially available catalysts used in removing or reducing the aromatic compounds are normally prone to sulfur poisoning. Therefore, it appears there is an ever-increasing need to develop a catalyst which is not sensitive to sulfur or sulfur-containing compounds and still can substantially reduce the concentration of the undesirable aromatic compounds.

SUMMARY OF THE INVENTION

An object of this invention is to provide a metal borate-containing composition. Also an object of this invention is to provide a process for producing this composition. Another object of this invention is to employ this composition in a process for hydrogenating aromatic hydrocarbons which are present in a hydrocarbon-containing fluid. An advantage of the invention is that the aromatic hydrocarbons content can be substantially reduced. Other objects will become apparent from the detailed description and the appended claims.

According to a first embodiment of this invention, a composition is provided which comprises an inorganic support having incorporated therein a hydrogenation catalyst wherein the support comprises aluminum, zirconium, and borate.

According to a second embodiment of this invention, a process is provided which comprises: (1) contacting an aluminum salt, a zirconium salt, and an acidic boron compound under a condition sufficient to effect the production of a solid inorganic support material comprising aluminum, zirconium, and borate; and (2) combining the support with a hydrogenation catalyst precursor.

According to a third embodiment of this invention, a process which can be used for catalytically hydrogenating an aromatic compound with hydrogen to a more saturated hydrocarbon is provided. The process comprises contacting a hydrocarbon-containing fluid which contains an aromatic compound, in the presence of a catalyst, with hydrogen under a condition effective to substantially hydrogenate the aromatic compound to a saturated compound.

DETAILED DESCRIPTION OF THE INVENTION

According to the first embodiment of the invention, the hydrogenation catalyst of the composition of this invention can be any hydrogenation catalyst known to one skilled in the art. Preferably, such catalyst is one of the Group VIII metals, Group VIII metal-containing compounds, or combinations of two or more thereof. The term "Group VIII" refers to the Periodic Table of the Elements, CRC Handbook of Chemistry and Physics, 67th edition, 1986–1987, CRC Press, Boca Raton, Fla. The presently preferred hydrogenation catalyst is platinum or a platinum compound such as platinum oxide.

The support component of the composition of this invention comprises, consists essentially of, or consists of, aluminum, zirconium, and borate. Aluminum and zirconium in the composition are generally not in the metal form. Preferably the support material comprises, consists essentially of, or consists of aluminum borate and zirconium borate. More preferably the support material comprises, consists essentially of, or consists of a zirconium/aluminum/borate composite.

Generally, the component has a weight ratio of Al to Zr in the range of from about 0.1:1 to about 30:1, preferably about 1:1 to about 20:1, and most preferably about 4:1 to about 12:1 and a weight ratio of (Al+Zr) to B in the range of from about 0.1:1 to about 10:1, preferably about 1:1 to about 6:1, and most preferably about 1.5:1 to about 3:1. Generally, the support component has a surface area, measured by the BET method employing $N_2$, of about 200 to about 400 $m^2/g$ and a pore volume, measured by a pore size distribution method employing $N_2$, of about 0.2–1.5 cc/g. It can have any suitable shape such as spherical, cylindrical, trilobal or irregular, or combinations of two or more thereof. It also can have any suitable particle size. The presently preferred size is about 0.4 to about 0.8 mm. If particles of the support component have been compacted and extruded, the formed cylindrical extrudates generally have a diameter of about 1 to about 4 mm and a length of about 3 to about 10 mm. It is within the scope of this invention to have minor amounts of aluminum oxide and zirconium oxide, generally about 1 to about 5 weight % of each, present in the support component. The hydrogenation catalyst component of the composition can be present in the composition of this invention in any quantity as long as that quantity can effect the substantial reduction of aromatic compound concentration in the product stream of an alkylation reaction. Generally, the weight % of the hydrogenation catalyst component in the invention composition can be in the range of from about 0.01 to about 50, preferably about 0.05 to about 25, and most preferably 0.1 to 15.

Preferably, the inorganic support component is prepared by a method comprising coprecipitation. A first aqueous solution containing any water-soluble aluminum salt such as, for example, aluminum nitrate; any water-soluble zirconium salt such as, for example, zirconyl nitrate; and any water-soluble acidic boron compound (preferably a boric acid, more preferably $H_3BO_3$) is prepared. Any suitable concentrations of these compounds in the aqueous solution can be employed so long as the concentration can result in the production of the inorganic support component disclosed above. Generally about 0.02 to about 1 mole/l of each compound, depending on the desired Al:Zr:B ratio can be employed. The initial pH of this aqueous solution is generally about 1 to about 3.

An aqueous alkaline solution, preferably an aqueous solution of ammonia containing about 25 to about 28 weight % $NH_3$, generally having a pH of about 10 to about 14, is then added to the first aqueous solution in an amount sufficient to raise the pH of the first solution to 7 or above 7, preferably to about 8–9, to afford the coprecipitation of borates of aluminum and zirconium.

The dispersion of the formed coprecipitate in the aqueous solution is then subjected to any suitable solid-liquid separation methods known to one skilled in the art such as, for example, filtration to substantially separate the coprecipitate from the aqueous solution. Preferably, the coprecipitate is washed with water to remove adhered solution therefrom, optionally followed by washing with a water-soluble organic solvent such as methanol, ethanol, isopropanol, acetone, or combinations of two or more thereof. The presently preferred solvent is isopropanol. The washed coprecipitate is generally dried by any methods known to one skilled in the art. The presently preferred drying is in a vacuum oven, under any pressure, at a temperature of about 110 to about 180° C. for about 2 to about 16 hours.

The dried solid is then calcined by any methods known to one skilled in the art. Generally calcination can be done in air, at a temperature of about 300 to about 1000° C., preferably about 350 to about 750° C., and most preferably 450 to 600° C., for about 1 to about 16 hours. It is within the scope of this invention to mix the formed coprecipitate with a carbon-containing binder material, such as a polyglycol, a polyoxazoline or carbon black, which is substantially burned off during the calcining step, and/or with an inorganic binder material such as, for example, alumina, colloidal alumina, clay, calcium aluminate, water glass or combinations of two or more thereof. It is also within the scope of this invention to extrude or pelletize or tablet the coprecipitate, with or without a binder, before the calcination.

The hydrogenation catalyst component of this invention can be combined with the support component in any suitable manner so long as the composition of this invention can be prepared. Generally, the support component is first impregnated with at least one dissolved hydrogenation catalyst compound such as by incipient wetness impregnation. The support component can also be sprayed with an impregnating solution containing at least one dissolved hydrogenation catalyst compound. Generally, the concentration of the hydrogenation catalyst compound in the impregnating solution is in the range of from about 0.1 to about 5 mol/l, preferably about 0.2 to about 2 mol/l. Preferably, the solvent of the impregnating solution is water or an alcohol such as ethanol or mixtures thereof. Suitable hydrogenation catalyst compounds which can be used to impregnate the support component include, but are not limited to, chloroplatinic acid, tetramine platinum hydroxide hydrate, platinum chloride, platinum bromide, platinum iodide, tetramine platinum nitrate, tetrachlorodiamine platinum, tetrakis (triphenylphosphine phosphine) platinum, platinum oxide, palladium acetate, palladium sulfate, palladium chloride, tetrapalladium sulfate, palladium nitrate, palladium diaminonitrile, nickel chloride, nickel nitrate, nickel sulfate, ammonium nickel sulfate, nickel acetate, nickel oxalate, hexamminenickel chloride, hexamminenickel nitrate, hexamminenickel sulfate, other coordination compounds of divalent nickel, rhenium oxides (such as $Re_2O_7$), rhenic acid ($H_2ReO_4$), perrhenic acid ($HReO_4$), alkali metal rhenates (such as $Na_2ReO_4$), alkali metal perrhenates (such as $NaReO_4$), ammonium rhenate, ammonium perrhenate, or combinations of two or more thereof. It should be noted that the metal of the hydrogenation catalyst compounds can have any available oxidation states. For example, platinum can have the oxidation state of 0, 2, 4, or combinations of two or more thereof. The presently preferred hydrogenation catalyst compound is chloroplatinic acid ($H_2PtCl_6.6H_2O$).

If it is desired to impregnate the inorganic support component additionally with at least one second hydrogenation catalyst such as, for example, a rhenium compound, this can be done before or concurrently with or after the impregnation with the first hydrogenation catalyst compound. The concentration of the second hydrogenation catalyst compound in the impregnating solution generally can be within the range disclosed above for the hydrogenation catalyst compound. The solvent of this impregnating solution can also be water and/or an alcohol, such as ethanol, or any other suitable liquid in which the particular second hydrogenation catalyst compound is soluble and stable.

The weight ratio of the hydrogenation catalyst-impregnating solution to the inorganic support component can be any ratio that can produce the composition disclosed in the first embodiment of this invention. Generally the weight ratio can be such as to attain a weight percentage of about 0.01 to about 50, preferably about 0.05 to about 25, and more preferably about 0.1 to about 15 weight % hydrogenation catalyst, on an elemental basis, in the finished composition, i.e., the composition obtained in the last step of the preparation method of this invention, as disclosed above. If impregnation with the second hydrogenation catalyst compound is also carried out, the weight ratio of the other hydrogenation catalyst-containing impregnating solution to the support component generally is such as to attain a weight percentage of about 0.01 to about 10, preferably about 0.05 to about 8, weight % the other hydrogenation catalyst, on an elemental basis, in the finished composition.

The hydrogenation catalyst-impregnated composition generally is dried at a temperature of about 5 to about 150° C. and then calcined under a condition which can be the same, or substantially the same, as the calcination of the support component disclosed above. The calcining step can be done in an inert atmosphere, i.e., in the presence of $N_2$, He, Ne, Ar, or combinations of two or more thereof. The calcining step can also be done in an $O_2$-containing atmosphere (e.g., air).

Before its use as a hydrogenation catalyst, the obtained calcined composition generally is treated with a reducing agent to reduce the oxidation state of the hydrogenation catalyst compound. The reducing agent is preferably a gas stream which comprises, or essentially of, hydrogen. The treatment can be carried out generally at a temperature of about 200 to about 550° C., preferably about 350 to about 450° C., for a time period of about 0.5 to about 10 hours. Other examples of reducing agents include, but are not limited to, carbon monoxide, $C_1$–$C_6$ alkanes, and $C_2$–$C_6$ alkenes, $C_4$–$C_6$ alkadienes, or combinations of two or more thereof.

The composition of this invention can be used in a variety of catalytic applications. In the third embodiment of this invention the composition is employed as a catalyst for hydrogenating aromatic hydrocarbons with a hydrogen-containing fluid, or hydrogen, to non-aromatic or more saturated hydrocarbons, such as alkenes, alkanes, cycloalkenes, cycloalkanes, or combinations of two or more thereof. Any aromatic compounds can be employed as feed. Examples of suitable feed aromatic hydrocarbons which can be hydrogenated generally contain 6 to about 30, preferably about 6 to about 25, and most preferably 6 to 20 carbon atoms per molecule and include, but are not limited to, benzene, toluene, ethylbenzene, o-xylene, m-xylene, p-xylene, trimethylbenzenes, tetramethylbenzenes, pentamethylbenzene, hexamethylbenzenes, methylethylbenzenes, ethyl-substituted benzenes, n-propyl-substituted benzenes, isopropyl-substituted benzenes, n-butyl-substituted benzenes, isobutyl-substituted benzenes, t-butyl-substituted benzenes, naphthalene, or combinations of two or more thereof.

The term "fluid" used herein refers to gas, vapor, liquid, or combinations of two or more thereof. The term "more saturated hydrocarbon" refers to non-aromatic hydrocarbon(s).

In a preferred application, a hydrocarbon feed stream comprises at least one aromatic hydrocarbon as a minor component, i.e., less than about 50 weight %, preferably about 0.1 to about 10 weight %, and most preferably less than 5 weight %, of the feed. The feed stream can also comprise a sulfur compound in minor content. When a sulfur compound is present in the feed stream, it is preferred the concentration of sulfur compound is less than about 1 weight %, preferably less than about 0.1 weight %, more preferably less than 0.05, and most preferably less than 0.01 weight % of sulfur. Any sulfur-containing compounds that are associated with a refining process can be present in the feed stream. Examples of sulfur compounds include, but are not limited to, thiophenes, thiophanes, thiophenols, sulfides, disulfides, mercaptans, mercaptides, and combinations of two or more thereof. The sulfur compounds commonly present in alkylation process are thiophenes such as benzo[b]thiophene, methylbenzolthiophene, dibenzothiophene, methyldibenzothiophene, and combinations of two or more thereof.

Generally, the feed stream comprises at least one alkane which can be straight chain or branched. Generally, the alkane can contain about 3 to about 30, preferably 6 to about 25, and most preferably 8 to 20 carbon atoms per molecule and is the major portion. In other words alkane or alkanes are present in the feed stream more than about 50 weight %, preferably more than 80 weight %, more preferably more than about 90 weight %, and most preferably more than 95 weight % of the feed.

According to the invention, a preferred feedstock is a product prepared by an alkylation process which can be further refined to a product that can be used as a specialty solvent such as that marketed under the tradename "Soltrol® Solvent" by Phillips Petroleum Company, Bartleville, Okla. The presence of aromatic hydrocarbons in this type of feedstock is undesirable, and can be removed by the hydrogenation process of this invention employing the catalyst composition of this invention. The alkylation process is well known to one skilled in the art and, for the interest of brevity, the description of which is omitted herein.

The process of the third embodiment of this invention can be carried out under any suitable condition which can substantially reduce the concentration of the aromatic compounds in the feed stream. The concentration of aromatic compounds is desirably reduced to less than about 0.1, more preferably to less than about 0.05, and most preferably to less than 0.03 weight %. Generally, the conditions can include a reaction temperature of about 10 to about 300° C., preferably about 125 to about 200° C., and most preferably 150 to 200° C., a reaction pressure that can accommodate the temperatures and generally in the range of about 300 to about 750 psig, preferably about 400 to about 500 psig, a liquid hourly space velocity of the hydrocarbon feed stream (cc liquid feed per cc catalyst per hour) of about 1 to about 5 cc/cc/hour, preferably about 1.5 to about 3 cc/cc/hour, and a gas hourly space velocity of hydrogen gas of about 100 to about 500 cc/cc catalyst/hour preferably about 150 to about 300 cc/cc/hour. The amount of $H_2$ in a hydrogen-containing fluid should be sufficient to hydrogenate essentially all aromatic hydrocarbons to saturated hydrocarbons. Generally, the aromatic hydrocarbon-containing feed stream is passed, together with a hydrogen-containing fluid, through a catalyst bed, either a fixed or a fluidized catalyst bed, containing the composition of this invention as the catalyst.

The hydrogenated product which exits the hydrogenation zone can undergo any desired separation such as, for example, distillation or a series of separations to obtain various purified product streams, primarily an alkane stream from which aromatic hydrocarbons have been substantially removed by the hydrogenation process of the third embodiment of this invention. The product of this hydrogenation process frequently is a mixture of alkanes and cycloalkanes, and each product component can be recovered from the hydrogenation product by any suitable, effective separation means known to one skilled in the art.

The following examples are presented to further illustrate the invention and are not to be considered as unduly limiting the scope of the invention.

EXAMPLE I

This example illustrates the preparation of various supported platinum catalyst compositions.

Control Catalyst A was a platinum catalyst, obtained from UOP Incorporated, Des Plains, Ill., under the "I-7" product designation, which had been activated by heating in a hydrogen gas stream for 4 hours at 420° C.

Control Catalyst B was a platinum catalyst, obtained from Calsicat, Erie, Pa., under the product designation "E291", which had been activated by heating in a hydrogen gas stream for 4 hours at 420° C.

Invention Catalyst C was Pt/Al—Zr borate containing 0.3 weight % Pt. First, the Al—Zr borate support material was prepared as follows: 13.2 grams (0.05 mole) of $ZrO(NO_3)_2 \cdot 2H_2O$ (formula weight: 267) and 221.1 grams (0.59 mole) of $Al(NO_3)_3 \cdot 9H_2O$ (formula weight: 375) were mixed with 40.0 grams (0.65 mole) of $H_3BO_3$ (boric acid; formula weight: 62) and 1.0 liter of distilled water. The mixture was heated and stirred until all solids were dissolved.

Thereafter, concentrated aqueous ammonia was added to the entire mixture, which had a pH of about 2, until the pH rose to 8.4 and an Al—Zr-borate coprecipitate was formed. The filter cake was washed with about 1.5 liter of distilled water and then with 1.5 liter of isopropanol. The solid filter cake was dried at 150° C. for about 16 hours (overnight) in a vacuum oven, followed by calcining in air at 500° C. for 4 hours. The calcined Al—Zr borate material (total 89.8 g) had a surface area, measured by the BET method using $N_2$ of 343 $m^2$/g and a pore volume, measured by a $N_2$ pore size distribution method, of 0.5 cm³/g. It contained 30.0 weight % Al, 8.4 weight % Zr and 11.0 weight % B (boron).

Then 14.2 grams of the Al—Zr borate support material was impregnated with a solution containing 0.1462 g of $H_2PtCl_6 \cdot 6H_2O$ in 200 grams of deionized water and 0.17 g of HCl. The impregnated material was dried for about 16 hours (overnight) at 158° C. and activated by heating in a hydrogen gas stream (100 cc/min) for 4 hours at 420° C.

EXAMPLE II

This example illustrates the use of the catalyst described in Example I in the hydrogenation of aromatic impurities contained in a heavy alkylation product containing primarily (97.5 weight %) $C_9$–$C_{17}$ isoparaffins produced by Phillips Chemical Company, Borger, Texas. This alkylation product is referred to herein as heavy alkylate which can be further refined to a product being marketed under the product designation "Soltrol® Solvent". This heavy alkylation feed contained about 2.5 weight % aromatic hydrocarbons, primarily isopropyl- and t-butyl-substituted mononuclear aromatic hydrocarbons having about 9 to about 17 carbon atoms per molecule. This heavy alkylation feed contained no sulfur.

A stainless steel reactor tube (inner diameter: 0.5 inch; length: 18 inches) was filled with a top layer of 14 cc of glass beads (3 mm), followed by 15 cc alumina (as a guard bed), glass wool, 20 cc of each of the above-described catalysts, glass wool, 15 cc of glass beads, and glass wool. Hydrogen gas was passed through the reactor at a flow rate of about 100 cc/minute. The reactor was heated to a temperature of about 400° F., and the liquid heavy alkylate feed, containing about 2.5 weight % aromatic hydrocarbons, was passed through the reactor, concurrently with the $H_2$ stream. The hydrotreated product stream, or reactor effluent, was sampled at about 1 hour interval and was quantitatively analyzed by means of a UV spectrophotometer using 1,2,4,5,-tetraisopropylbenzene as a reference API standard. The results showed that, after about 300 hours of continuous operation, the average aromatic hydrocarbons content in the product stream for control catalyst A was about 300 ppm by weight, for control catalyst B was about 200 ppm, and for the invention catalyst C was about 20 ppm.

In a separate run, the invention catalyst C was used in a hydrogenation of aromatic hydrocarbons impurities added to a heavy alkylation product. The run was carried out the same as above except that the aromatic compounds content in the feed was 3 weight %. The average aromatic compounds content in the product stream, in this run, was about 88 ppm, again, a substantially reduction from the feed.

EXAMPLE III

This example illustrates the use of the invention composition for hydrogenating aromatic compounds to more saturated hydrocarbons in which the hydrocarbon feed containing the aromatic compounds contained a sulfur compound.

Benzo[b]thiophene (BTP) was employed as sulfur impurity in this example because it and other similar organic compounds (methylbenzothiophene, dibenzothiophene, and methyl dibenzothiophene) are commonly found in refinery streams after the cracking process. It is resistant to hydrodesulfurization (HDS) processing and to commercial HDS catalysts.

To make the total feed stock, 0.1732 g of BTP was added to 3004 g of a heavy alkylate to give a 0.0058 weight % BTP solution (58 ppm BTP or 13.8 ppm by weight sulfur).

The hydrogenation process was carried out as described in Example II. The results showed that catalyst A was poisoned by BTP within 4 hours whereas catalyst B was poisoned with BTP within 2 hours run time. Attempts to regenerate catalysts A and B to the original conversion to the 300 ppm and 200 ppm (see Example II) of aromatic compounds were unsuccessful. The final aromatic compounds content in the run with catalyst A was 6,500 ppm and that with catalyst B was 8,400 ppm.

The invention catalyst C ran for about 18 hours at the <300 ppm level before a decrease in activity was noted. It was then regenerated with $H_2$ back to the original conversion level.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process comprising (1) contacting an aluminum salt, a zirconium salt, and an acidic boron compound under a condition sufficient to effect the production of a solid inorganic support comprising aluminum, zirconium, and borate; and (2) combining said support with a hydrogenation catalyst precursor to produce a combination of hydrogenation catalyst and a support.

2. A process according to claim 1 wherein said support produced in step (1) is calcined prior to step (2).

3. A process according to claim 2 wherein said combination produced in step (2) is calcined.

4. A process according to claim 1 wherein said aluminum salt is aluminum nitrate.

5. A process according to claim 1 wherein said zirconium salt is zirconyl nitrate.

6. A process according to claim 1 wherein said acidic boron compound is boric acid.

7. A process according to claim 1 wherein said hydrogenation catalyst precursor is selected from the group consisting of chloroplatinic acid, tetramine platinum hydroxide hydrate, tetrachlorodiamine platinum, platinum chloride, platinum bromide, platinum iodide, tetrakis (triphenylphosphine phosphine) platinum, platinum oxide, tetramine platinum nitrate, palladium acetate, palladium sulfate, palladium chloride, tetrapalladium sulfate, palladium nitrate, palladium diaminonitrile, nickel chloride, nickel nitrate, nickel sulfate, ammonium nickel sulfate, nickel acetate, nickel oxalate, hexamminenickel chloride, hexamminenickel nitrate, hexamminenickel sulfate, coordination compounds of divalent nickel, rhenium oxides, rhenic acid ($H_2ReO_4$), perrhenic acid ($HReO_4$), alkali metal rhenates, alkali metal perrhenates, ammonium rhenate, ammonium perrhenate, or combinations of two or more thereof.

8. A process according to claim 1 wherein said hydrogenation catalyst precursor is chloroplatinic acid.

9. A process according to claim 1 wherein
said aluminum salt is aluminum nitrate;
said zirconium salt is zirconyl nitrate;
said acidic boron compound is boric acid; and
said hydrogenation catalyst precursor is selected from the group consisting of chloroplatinic acid, tetramine platinum hydroxide hydrate, platinum chloride, tetrakis (triphenylphosphine phosphine) platinum, platinum oxide, palladium acetate, palladium sulfate, palladium chloride, tetrapalladium sulfate, palladium nitrate, palladium diaminonitrile, nickel chloride, nickel nitrate, nickel sulfate, ammonium nickel sulfate, nickel acetate, nickel oxalate, hexamminenickel chloride, hexamminenickel nitrate, hexamminenickel sulfate, coordination compounds of divalent nickel, rhenium oxides, rhenic acid ($H_2ReO_4$), perrhenic acid ($HReO_4$), alkali metal rhenates, alkali metal perrhenates, ammonium rhenate, ammonium perrhenate, or combinations of two or more thereof.

10. A process according to claim 3 wherein said aluminum salt is aluminum nitrate;

said zirconium salt is zirconyl nitrate;

said acidic boron compound is boric acid; and said hydrogenation catalyst precursor is selected from the group consisting of chloroplatinic acid, tetramine platinum hydroxide hydrate, platinum chloride, tetrakis (triphenylphosphine phosphine) platinum, platinum oxide, palladium acetate, palladium sulfate, palladium chloride, tetrapalladium sulfate, palladium nitrate, palladium diaminonitrile, nickel chloride, nickel nitrate, nickel sulfate, ammonium nickel sulfate, nickel acetate, nickel oxalate, hexamminenickel chloride, hexamminenickel nitrate, hexamminenickel sulfate, coordination compounds of divalent nickel, rhenium oxides, rhenic acid ($H_2ReO_4$), perrhenic acid ($HReO_4$), alkali metal rhenates, alkali metal perrhenates, ammonium rhenate, ammonium perrhenate, or combinations of two or more thereof.

11. A process according to claim 7 wherein said hydrogenation catalyst precursor is chloroplatinic acid.

12. A process according to claim 10 wherein said hydrogenation catalyst precursor is chloroplatinic acid.

13. A process comprising (1) contacting an aluminum salt, a zirconium salt and an acidic boron compound under a condition sufficient to effect the coprecipitation of a solid inorganic support comprising aluminum borate and zirconium borate; and (2) combining said solid inorganic support with a platinum hydrogenation catalyst compound selected from the group consisting of chloroplatinic acid, tetramine platinum hydroxide hydrate, tetrachlorodiamine platinum, platinum chloride, platinum bromide, platinum iodide, tetrakis (triphenylphosphine) platinum, platinum oxide and tetramine platinum nitrate to produce a combination of said platinum hydrogenation catalyst compound and said solid inorganic support.

14. A process according to claim 13 wherein said solid inorganic support produced in step (1) is calcined prior to step (2).

15. A process according to claim 14 wherein said combination produced in step (2) is calcined.

16. A process according to claim 15 wherein said aluminum salt is aluminum nitrate, said zirconium salt is zirconyl nitrate, said acidic boron compound is boric acid; and said platinum hydrogenation catalyst compound is chloroplatinic acid.

17. A process comprising (1) contacting an aluminum salt, a zirconium salt and an acidic boron compound under a condition sufficient to effect the coprecipitation of a solid inorganic support consisting essentially of aluminum borate and zirconium borate; and (2) combining said solid inorganic support with a platinum hydrogenation catalyst compound selected from the group consisting of chloroplatinic acid, tetramine platinum hydroxide hydrate, tetrachlorodiamine platinum, platinum chloride, platinum bromide, platinum iodide, tetrakis (triphenylphosphine) platinum, platinum oxide and tetramine platinum nitrate to produce a combination of said platinum hydrogenation catalyst compound and said solid inorganic support.

18. A process according to claim 17 wherein said solid inorganic support produced in step (1) is calcined prior to step (2).

19. A process according to claim 18 wherein said combination produced in step (2) is calcined.

20. A process according to claim 19 wherein said aluminum salt is aluminum nitrate, said zirconium salt is zirconyl nitrate, said acidic boron compound is boric acid; and said platinum hydrogenation catalyst compound is chloroplatinic acid.

* * * * *